United States Patent

Jeon et al.

[11] Patent Number: 5,926,338
[45] Date of Patent: Jul. 20, 1999

[54] METHOD FOR CONTROLLING REPEATABLE FOLLOWING ERROR IN A HARD DISK DRIVE

[75] Inventors: Do-Young Jeon, Seoul; Kang-Seok Lee, Suwon, both of Rep. of Korea

[73] Assignee: SamSung Electronics Co., Ltd., Suwon, Rep. of Korea

[21] Appl. No.: 08/842,216

[22] Filed: Apr. 24, 1997

[30] Foreign Application Priority Data

Apr. 24, 1996 [KR] Rep. of Korea ..................... 96-12697

[51] Int. Cl.$^6$ ................................................. G11B 5/596
[52] U.S. Cl. ....................................................... 360/77.04
[58] Field of Search ................................ 360/77.04, 75, 360/77.02, 77.08

[56] References Cited

U.S. PATENT DOCUMENTS

| | | |
|---|---|---|
| 4,217,612 | 8/1980 | Matla et al. . |
| 4,575,776 | 3/1986 | Stephens et al. . |
| 4,636,885 | 1/1987 | Yamada et al. . |
| 5,089,757 | 2/1992 | Wilson . |
| 5,233,487 | 8/1993 | Christensen et al. . |
| 5,465,182 | 11/1995 | Ishikawa . |
| 5,539,714 | 7/1996 | Andrews, Jr. et al. .......... 360/77.04 X |
| 5,541,784 | 7/1996 | Cribbs et al. . |
| 5,550,685 | 8/1996 | Drouin ............................ 360/77.04 X |
| 5,576,909 | 11/1996 | Dierkes et al. . |
| 5,585,976 | 12/1996 | Pham ................................... 360/77.04 |

*Primary Examiner*—Aristotelis M. Psitos
*Assistant Examiner*—James L Habermehl
*Attorney, Agent, or Firm*—Robert E. Bushnell, Esq.

[57] ABSTRACT

A method for controlling a repeatable following error of a hard disk drive, which includes a digital signal processor programmed with a feedback control operation algorithm and a repetition control algorithm. The method includes obtaining data corresponding to position error signals from sectors detected along a track of a disk recording medium during a track following mode; sequentially storing the data corresponding to the position error signals in a table; and obtaining a correction value for compensating a repeatable following error for a particular sector by processing the data corresponding to a position error signal of said particular sector and the data corresponding to the position error signals of preceding and succeeding sectors read from the table through the repetition control algorithm and feedback control algorithm.

12 Claims, 5 Drawing Sheets

METHOD FOR CONTROLLING REPEATABLE FOLLOWING ERROR IN A HARD DISK DRIVE

CLAIM FOR PRIORITY

This application makes reference to, incorporates the same herein, and claims all benefits accruing under 35 U.S.C. §119 from an application for METHOD FOR CONTROLLING A REPEATED FOLLOWING ERROR IN A HARD DISK DRIVE earlier filed in the Korean Industrial Property Office on Apr. 24, 1996, and there duly assigned Serial No. 96-12697.

BACKGROUND OF THE INVENTION

1. Technical Field

The present invention relates to a method for compensating head position of a hard disk drive, and more particularly, relates to a repeated control method for compensating repeatable following errors which occur due to an unbalanced spindle or by an eccentricity of magnetic disk.

2. Related Art

The development of hard disk drive technology as well as the rapid progress of VLSI and software technology has played an important role in developing the modern information industry for last decades. The trend of hard disk drive technology is toward miniaturization in terms of size, higher capacity, faster seek times and lower cost, and the density of data write is increased by almost ten times every ten years. This trend is expected to continue in the future.

The servo controller of hard disk drive is configured so as to operate two servo modes in accordance with the moving distance of a head. The first servo mode relates to a track seek mode in which a head accesses tracks of the disk to search for a target track and transition over the target track for reading and writing data on the target position. The second servo mode relates to a track settle mode or track following mode in which the head is accurately positioned on a data line of the target track after the head has reached the target track. In order to increase the density of data write, it is necessary to reduce track mis-registration ("TMR") which is a difference between the center of track and the physical position of head, and to perform high precision servo control of the head arm in the track-following mode.

The servo control technology can be classified as dedicated servo control and embedded servo control according to detection of a position error signal (PES). The dedicated servo control technique detects the PES signal by utilizing an independent original disk having only position information of head. Exemplary configuration is disclosed in U.S. Pat. No. 5,233,487 for Functional Measurement Of Data Head Misregistration issued to Christensen et al. By contrast, the embedded servo control technique utilizes position information written on every sector of data track. Exemplary configurations are disclosed in U.S. Pat. No. 4,217,612 for Servo System For Track Accessing And Track Following In A Disk Drive issued to Matla et al., U.S. Pat. No. 4,636,885 for Servo System For A Magnetic Disk Memory Having Spiral Tracks issued to Yamada et al., U.S. Pat. No. 5,541,784 for Bootstrap Method For Writing Servo Tracks On A Disk Drive issued to Cribbs et al., and U.S. Pat. No. 5,576,909 for Method For Positioning A Data Transducer Head In A Rotating Disk Drive Data Storage Device issued to Dierkes et at. Generally, the dedicated servo control technique has an advantage for designing a controller having a band wider than that of the embedded servo control technique as the dedicated servo method is able to detect position information continuously. However, the inconsistency of position information disk with data disk due to degradation of the disks still causes track misregistration. As a result, the embedded servo control technique is widely used recently.

During the track-following operation, conventional HDD servo controller has been implemented using a proportional integral derivative control method, known in the art as PID control, in order to compensate an off-track of head by obtaining PES to position a magnetic head in close contact with track center for data read and write. If the track center of the disk is consistent with the spindle center, there is no repeated ingredient in input following errors by using the conventional controller. However, the frequency ingredient having a base mode of disk rotation frequency of error ingredients may occur as it is impossible to consistently position the center of the disk with that of the spindle. As a result, repeatable run out errors often occur at the disk rotation frequency. Recent efforts in the art such as disclosed in U.S. Pat. No. 5,539,714 for Adaptive Runout Compensation For Miniature Disk Drives issued to Andrews, Jr. et al., and U.S. Pat. No. 5,585,976 for Digital Sector Servo Incorporating Repeatable Run Out Tracking issued to Pham, provide servo control systems which compensate for repeatable run out errors. However, it is my observation that these servo control systems are often complex, and further improvement can still be contemplated.

SUMMARY OF THE INVENTION

Accordingly, it is therefore an object of the present invention to provide an improved servo control system for a hard disk drive.

It is also an object to provide a method for compensating repeatable following errors which occur due to an eccentricity of magnetic disk in a hard disk drive.

These and other objects of the present invention may be achieved by a method for compensating a repeatable following error of a hard disk drive having a digital signal processor programmed with a feedback control operation algorithm and a repetition control algorithm. The method includes obtaining data corresponding to position error signals from sectors detected along a track of a disk recording medium during a track following mode; sequentially storing the data corresponding to the position error signals in a table; and obtaining a correction value for compensating a repeatable following error for a particular sector by processing the data corresponding to a position error signal of that particular sector and the data corresponding to the position error signals of preceding and succeeding sectors read from the table using the repetition control algorithm and feedback control algorithm.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
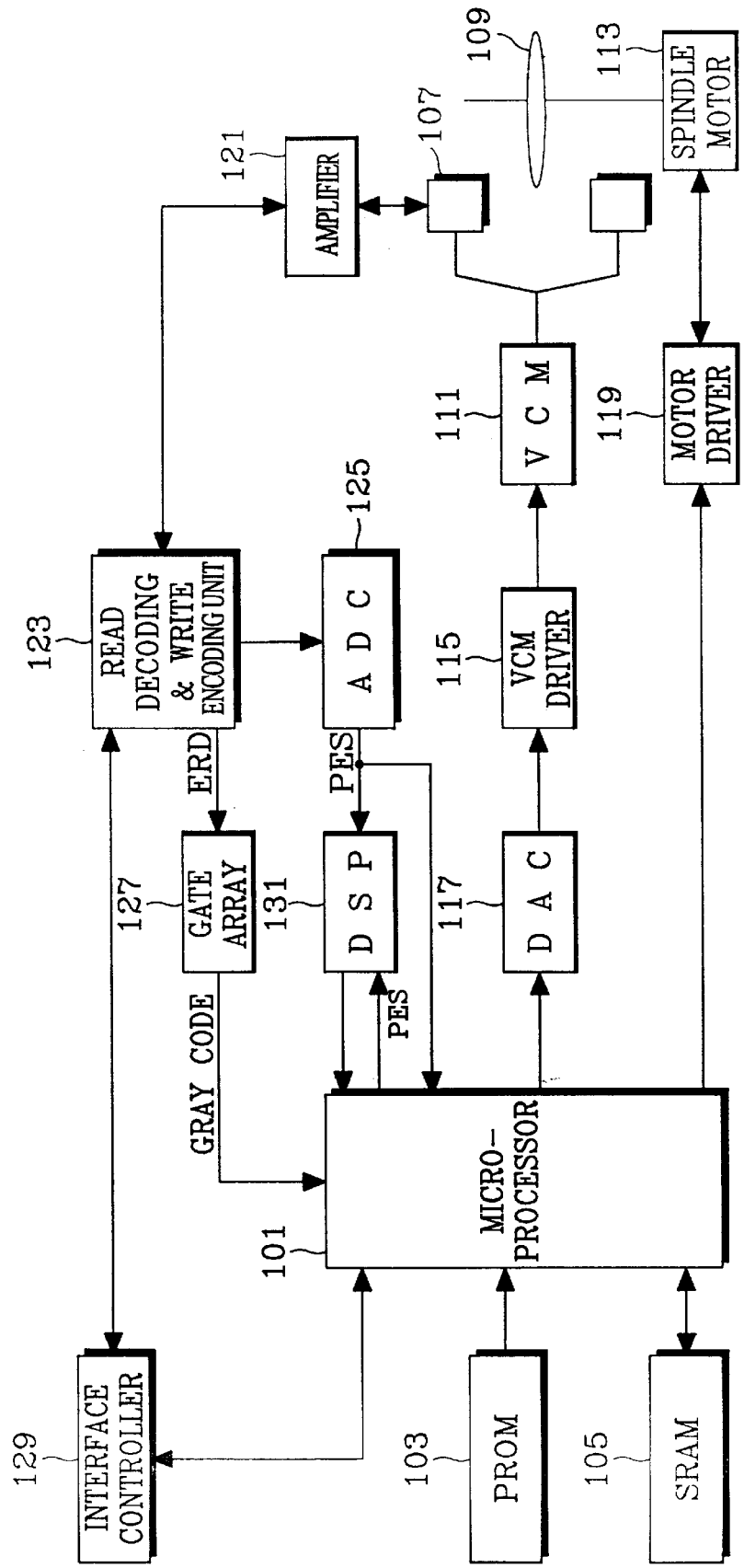
FIG. 1 is a block diagram of a hard disk drive constructed according to the principles of the present invention.

Referring now to the drawings and particularly to FIG. 1, which illustrates a servo control configuration of a disk recording system constructed according to the principles of the present invention. This servo control configuration includes a micro-processor 101, a programmable read-only-memory (PROM) 103, a static random-access-memory (SRAM) 105, a head 107, a disk 109, a voice coil motor (VCM) 111, a spindle motor 113, a VCM driver 115, a digital-to-analog converter (DAC) 117, a motor driver 119, an amplifier 121, a read decoding and write encoding unit 123, an analog-to-digital converter (ADC) 125, a gate array 127, an interface controller 129 and a digital servo processor 131.

In the preferred servo control configuration of the present invention as shown in FIG. 1, the micro processor 101 is connected to the PROM 103 which stores a control program executed in the micro processor 101 and the SRAM 105 which stores position error signal PES of all sectors obtained from a certain track sequentially. The head 107 performs a horizontal movement on a disk 109 as a recording medium, and reads/writes data at a target position on the disk 109. The VCM 111 serves as an actuator and is connected to the head 107 to thereby activate the head 107 in the horizontal direction on the disk 109. The spindle motor 113 serves as a disk rotating device and is connected to the disk 109 at its own driving axis, thus to rotate the disk 109. A VCM driver 115 is connected to the VCM 111 and controls the activation thereof.

The DAC 117 is connected to the micro processor 101 and the VCM driver 115, respectively. The DAC 80 receives a digital control signal from the micro processor 101, converts the digital control signal into an analog form and provides an analog-converted signal to the VCM driver 115. A motor driver 119 is connected to the spindle motor 113 and the micro processor 101 respectively, and controls the activation of the spindle motor 113 under the control of the micro processor 101. An amplifier 121 is connected to the head 107, amplifiers a signal read by the head 107, and outputs the amplified signal. Additionally, the amplifier 121 amplifies an input signal to be written and outputs the amplified input signal to the head 107. An interface controller 129 transmits and receives data to/from an external data input device (not shown) under the control of the microprocessor 101. A read decoding and write encoding unit 123 is connected to the micro processor 101, the amplifier 121 and the interface control unit 129. Under the control of the micro processor 101, the read decoding and write encoding unit 123 receives writing data from the interface controller 129 and encodes the data to an analog flux conversion signal, thereby outputting the signal to the amplifier 121. The reading decoding and writing encoding unit 123 also converts the analog reading signal received from the amplifier 121 into digitally encoded read data (hereinafter, ERD signal) for decoding and outputting the ERD signal as read data.

The ADC 125 is connected to the read decoding and write encoding unit 123, from which the ADC 125 receives the analog servo reading signal and converts the received signal into the PES for output to the DSP 129. The DSP 129 receives the PES for each sector in a track in digital form from the ADC 125, determines the position correction needed to position head 109 over the centerline of the track for that sector, and transmits a correction value to the micro processor 101 for compensating for repeatable following errors which occur due to an unbalanced spindle or an eccentricity of magnetic disk in the hard disk drive. A gate array 127 is connected to the read decoding and write encoding unit 123 and receives the ERD signal therefrom. Thus, the gate array 127 outputs from the ERD signal each servo information detection and timing clock detection of a gray code within the servo area of the disk 109. In the construction as described above, the micro processor 101 executes the overall control operation in a servo control apparatus of the disk recording system.

Figure 2:
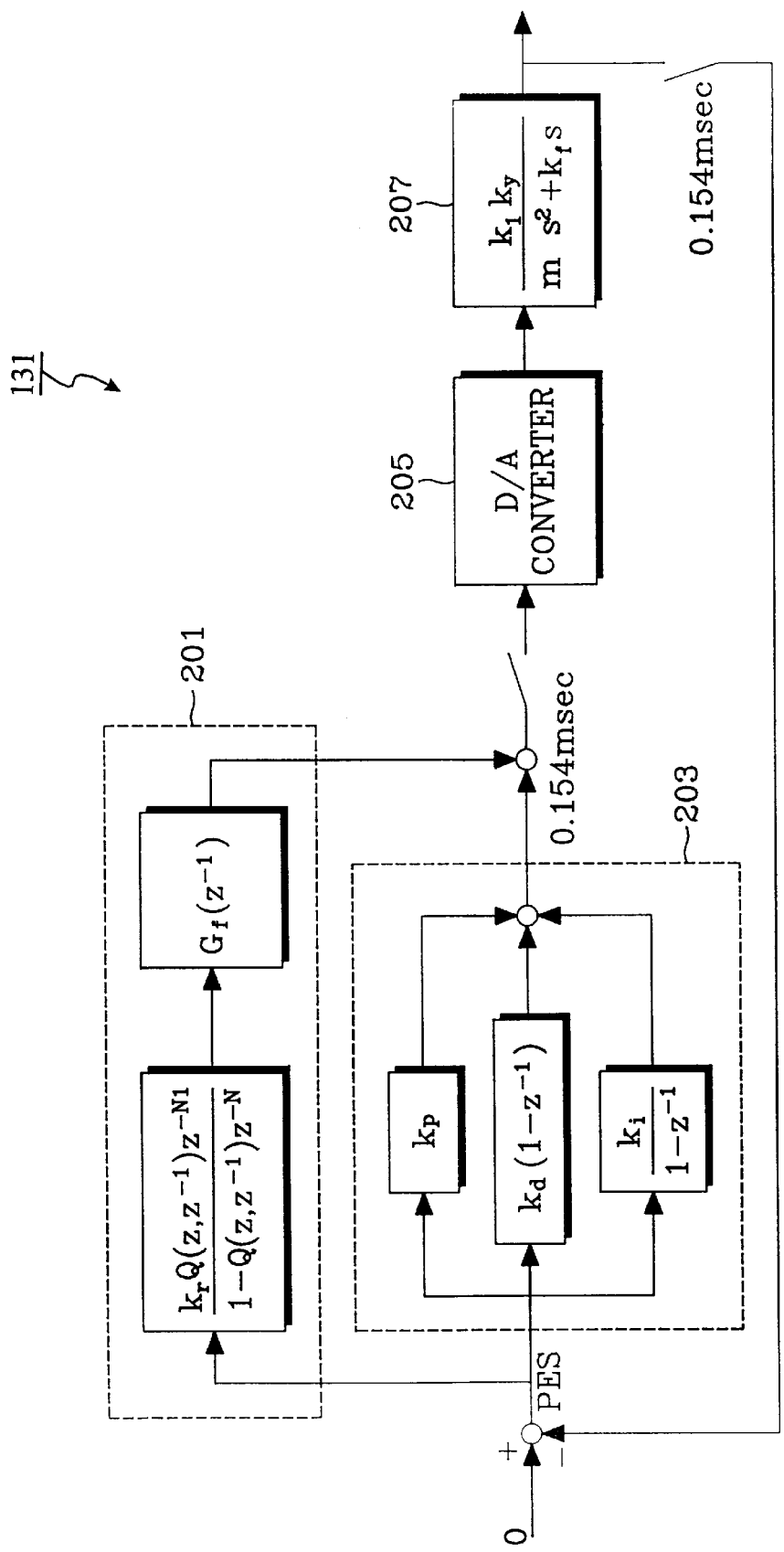
FIG. 2 is an abstract representation of a repeatable following error compensation scheme according to the principles of the present invention.

Turning now to FIG. 2, which illustrates an abstract representation of a repeatable following error compensation algorithm of the DSP 131 according to the principles of the present invention. A feedback control algorithm 203 receives the PES of sector and generates a functional value by summing up three values obtained by calculating the PES using proportional, differential and integral equations as follows.

$$\text{Proportion} = Kp \qquad \text{Eq. 1}$$

$$\text{Differentiation} = Kd(1-Z^{-1}) \qquad \text{Eq. 2}$$

$$\text{Integration} = \frac{K_i}{1-Z^{-1}} \qquad \text{Eq. 3}$$

wherein Kp represents a proportional gain, that is, a gain proportional to error. Kd represents a derivation gain, that is, a gain to the derivative of error. Ki represents an integral gain, that is, a gain to the integration of error.

A repetition control algorithm 201 receives each PES before and after the present sector read from the SRAM 105, and generates therefrom an average value by filtering the PES of a sector from the feedback control algorithm 203 in accordance with following operation algorithms.

$$G_r(Z^{-1}) = \frac{k_r Q(Z, Z^{-1}) Z^{N_2} G_f(Z^{-1})}{Z^N - Q(Z, Z^{-1})} \qquad \text{Eq. 4}$$

$$C(k) = k_r Q(Z, Z^{-1}) \frac{Z^{-N_1}}{1 - Q(Z-N)} e(k) \qquad \text{Eq. 5}$$

wherein G represents a transfer function, and $Q(Z,Z^{-1})$ represents the average of the PES of the present sector and PES of the preceding and succeeding sectors.

At this time, equation 5 can be developed into following equation 6, wherein k represents a present sector in a track, N represents a number of sectors per disk revolution or one period of revolution which, in this example, is 72 sectors, and $N_1$ and $N_2$ are represent sectors before, and after the present sector and Q is for a filter.

$$C(k)=QC(k-N)+k_rQe(k-N^{-1}) \qquad \text{Eq. 6}$$

Figure 3:
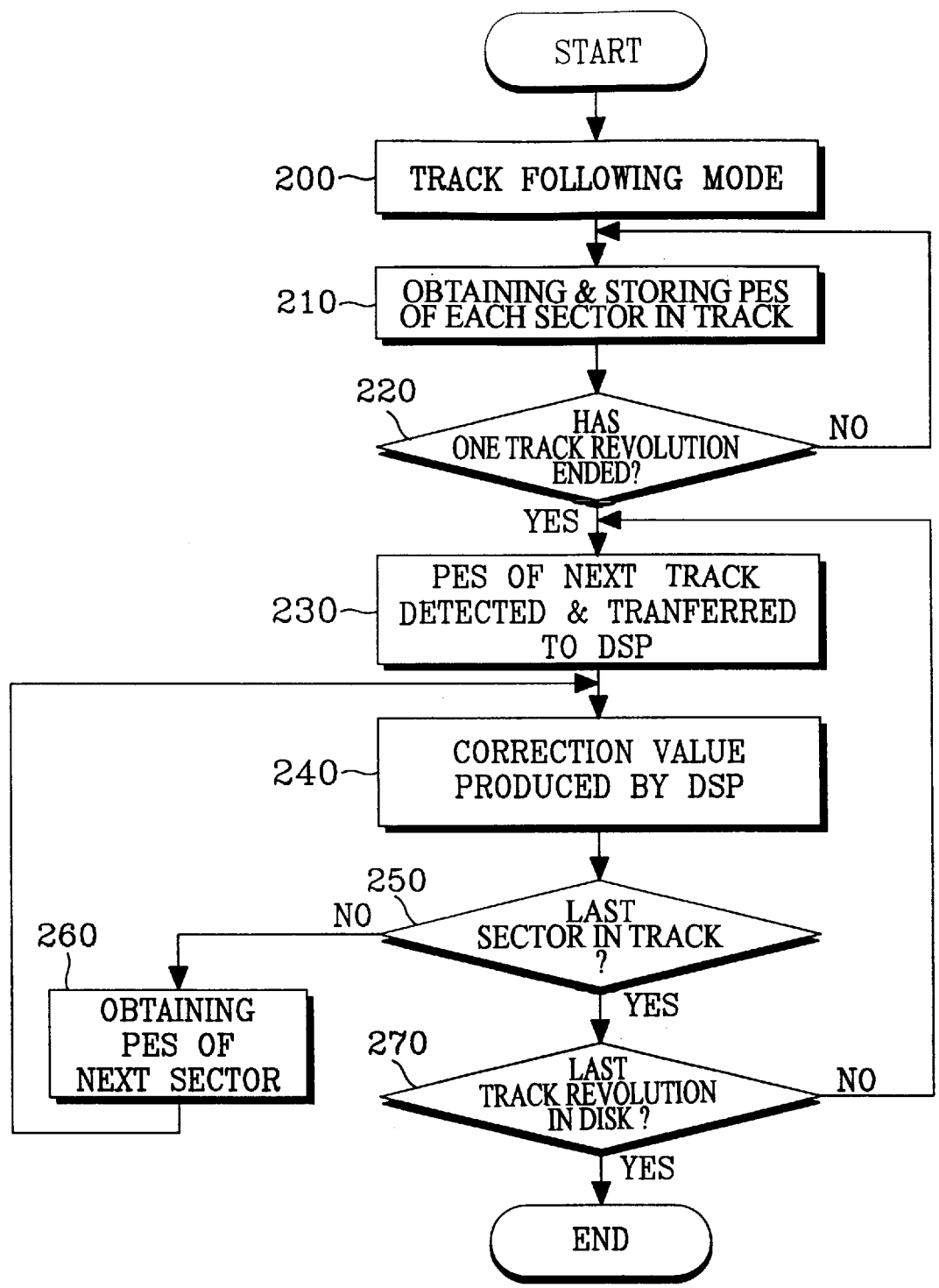
FIG. 3 is a flow chart of controlling a repeatable following error according to the principles of the present invention.

Referring to FIG. 3, which illustrates a repeatable following error control process of the DSP 131 according to the principle of the present invention. Generally, PES of a given sector and PES of sectors before and after the given sector are read from a table contained in the SRAM 105 after obtaining PES from each sector of a track in a track following mode, a correction value is obtained by processing the PES of the current sector, the preceding and subsequent sectors in the track in the repetition control algorithm and the feedback control algorithm of the DSP 129 for following a certain track. More specifically, when the servo control system is in a track following mode at step 200, the PES for each sector is obtained and stored in the table of SRAM 105 at step 210 until the end of each period at step 220, that is, each revolution of disk. After the PES of all sectors in a track is stored in the table, the PES of the next period is detected and transferred to the DSP 131 at step 230. The DSP 131 in response thereto produces a correction value to the micro processor 101 for compensating for repeatable following errors for each sector at step 260 until the last sector in each track at step 250 and last track revolution in the disk at step 270.

Figure 4:
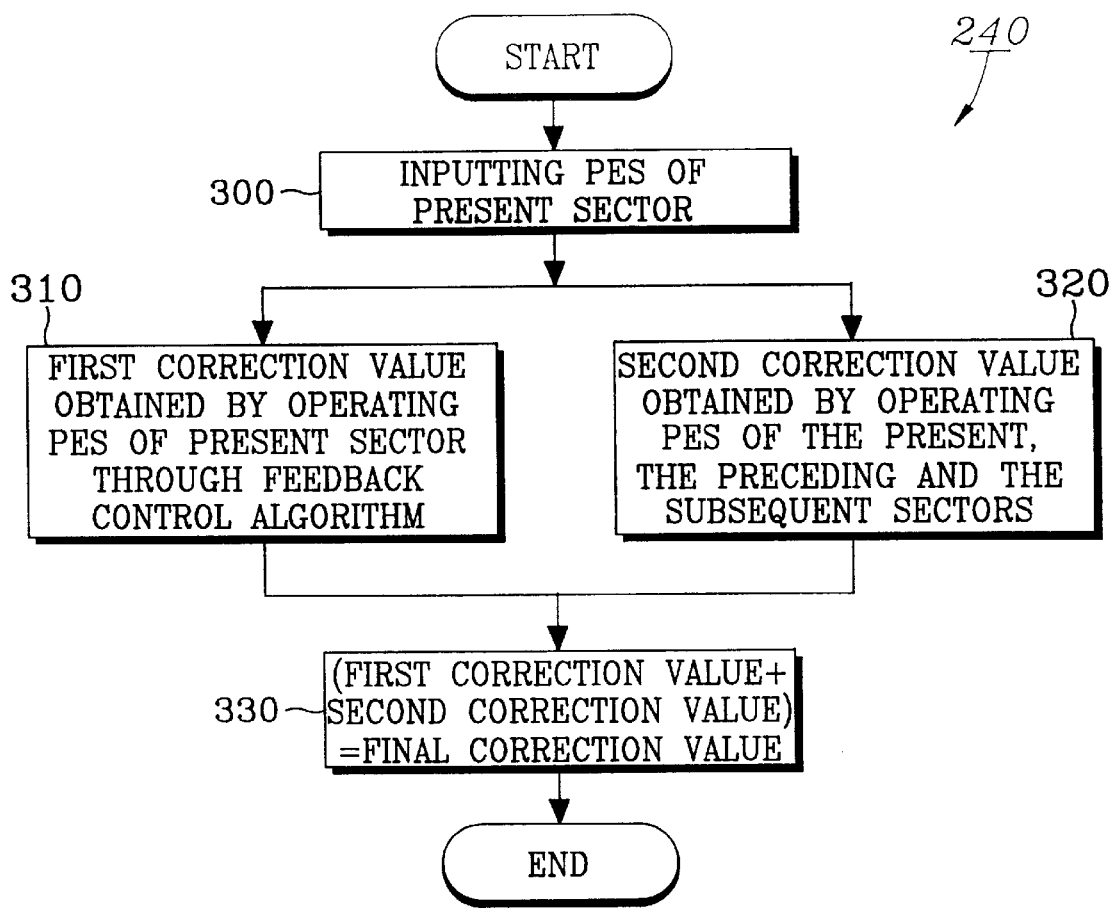
FIG. 4 is an abstract representation of a control algorithm of a digital signal processor used for controlling repeatable following errors of a hard disk drive according to the present invention.

FIG. 4 represents a control algorithm of the DSP 131 for generating a correction value as shown in step 240 of FIG. 3 in order to control repeatable following errors of the hard disk drive according to the present invention. For each input PES of a present sector in a track at step 300, a first correction value is obtained by calculating the PES of present sector using proportional, differential and integral equations as shown in Equations 1–3 in accordance with the feedback control algorithm of the DSP 131 at step 310. And simultaneously a second correction value is obtained by processing the PES of the present sector and two PES of sectors before and after the present sector at step 320. The final correction value is obtained by processing the first and second correction values at step 330.

Figure 5:
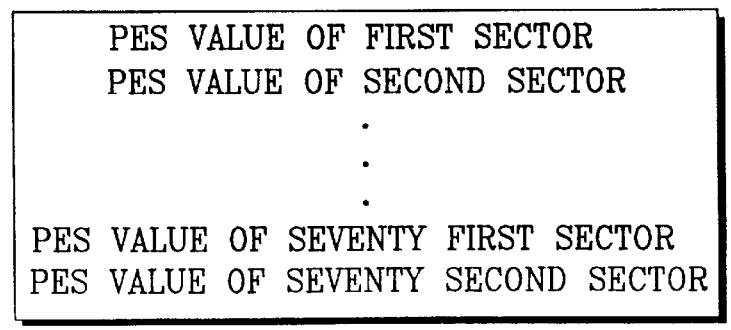
FIG. 5 illustrates a table for storing a position error signal of each sector in a track according to the principles of the present invention.

Refer now to FIG. 5, which illustrates a table contained in the SRAM 105 for sequentially storing 72 PES values for 72 sectors in each track obtained per track revolution when the servo control system follows a track in the disk 109.

Figure 7:
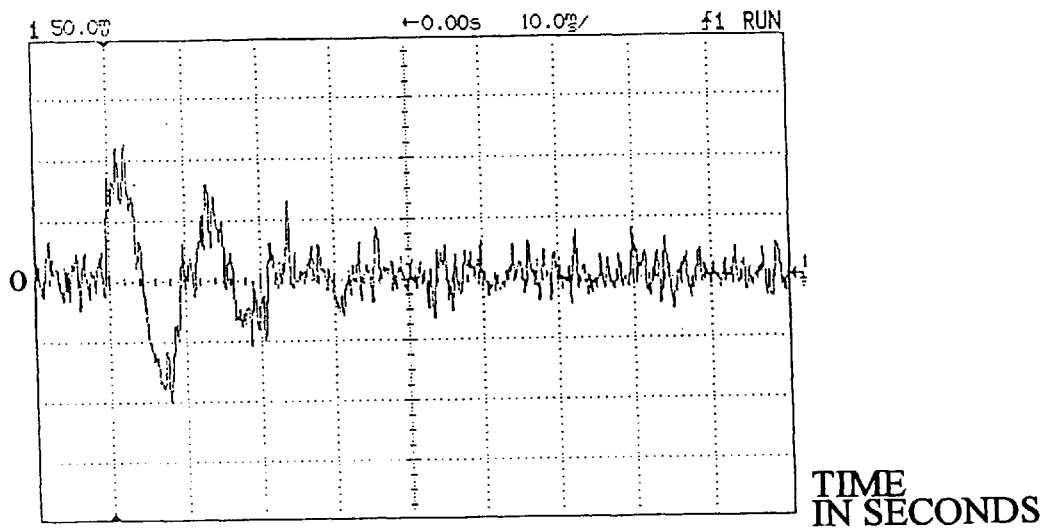
FIG. 7 is a characteristic curve diagram of position error signal obtained by using a repeatable control algorithm according to the principles of the present invention.

The flow chart of FIGS. 3 and 4 and the characteristic curve of FIG. 7 are now described with reference to FIGS. 1 and 2. A method for compensating repetition following ingredients occurring in one certain track in the track following mode is described in detail as follows.

The head 107 is positioned on a certain track of the disk 109 in the track-following mode at step 200 and reads burst signals of servo area of each sector of the certain track under control of the micro processor 101 at step 210. The burst signal is converted to PES by the read decoding and write encoding unit 123 and the PES of each sector of the certain track is sequentially stored in the table of SRAM 105 as shown in FIG. 5. The micro processor 101 confirms whether the head 107 reads all of 72 sectors of one period or track revolution at step 220. When all of 72 sectors of one period are not read fully, the head 107 reads PES of next sector by feedback at step 210 and the PES is stored in the SRAM 105. When all sectors of one period are read fully, the head 107 reads a burst signal of servo area of first sector of next period or track revolution under control of the micro processor 101. The read burst signal is converted to PES by the read decoding and write encoding unit 123 and transmitted to the DSP 129. The final correction value is obtained by the DSP 129 under control of the micro processor 101 at step 240.

Referring to FIG.4, the step 240 is described more specifically by the function of the DSP 129. When receiving the PES from the read decoding and write encoding unit 123, the feedback control algorithm 203 of the DSP 129 generates the first correction value by processing the PES with the above described three Equations. 1, 2 and 3, and summing up the three values as one functional value at step 310.

Simultaneously the repetition control algorithm 201 of the DSP 129 generates the second correction value by filtering the PES of the feedback control algorithm 203 and two PES of sectors before and after the present sector read from the SRAM table 105 with the above described Equations 4 and 5 and obtaining their average value at step 320.

Next, equation 5 is converted to equation 6, wherein k represents the present sector, N represents 72 sectors in each period or track revolution, N1 and N2 are for sectors before and after the present sector and Q is for filter.

The final correction value is generated by summing up the first correction value from the feedback control algorithm 203 and the second correction value from the repetition control algorithm 201 at step 330.

Refer back to FIG.3, the micro processor 101 confirms whether the sector being followed is a final sector in a current track at step 250. If the sector being followed is not the final sector in the current track, PES of next sector is obtained at step 260 and then fed back to step 240. If the sector being followed is the final sector in the current track at step 250, however, the micro processor 101 confirms whether the track being followed is a final track revolution in the disk at step 270. If the track currently being followed is not the final track revolution in the disk, PES of first sector of next track is obtained and transmitted to the DSP 129 by feeding back to step 230. When the subsequent track is confirmed to be the final track in the disk at step 270, the program is terminated. After the disk is rotated by one period, the PES of which repetition following error ingredient is finally compensated.

Figure 6:
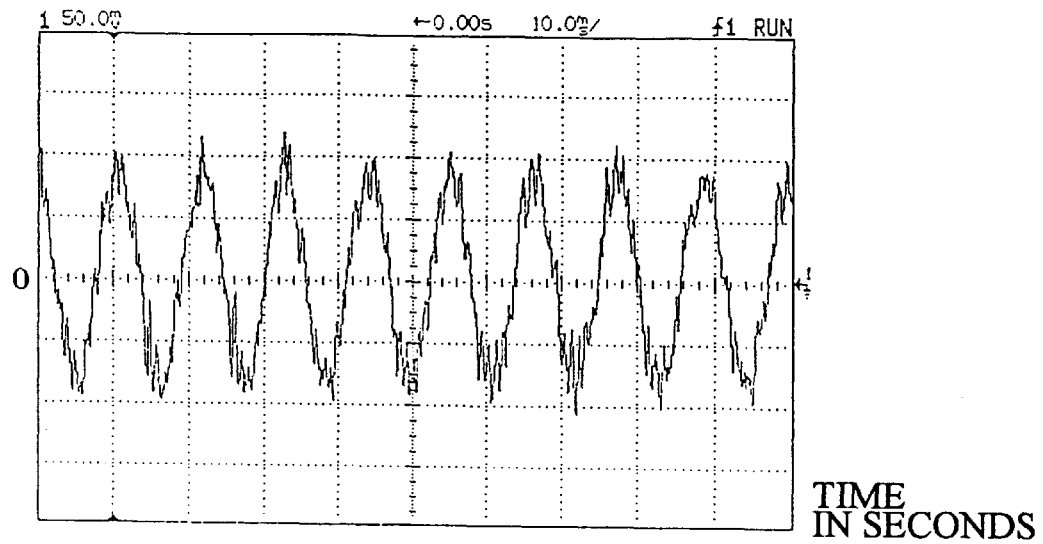
FIG. 6 is a characteristic curve diagram of position error signal obtained by using a conventional PID control algorithm only.

FIGS. 6 and 7 compare the PES from the conventional servo control algorithm and the PES from the repeatable control algorithm of the servo control system constructed according to the principles of the present invention. As shown in FIG. 6, the PES obtained by the conventional servo control algorithm during the track following mode has a greater percentage of off-track run out in relative to time, in seconds, as opposed to the PES obtained by the repeatable control algorithm of the servo control system according to the present invention.

In case of the same repetition following ingredient of previous track being occurred in the same position of another track, the present following track compensated by the repetition control algorithm is moved to another track and another track is compensated by the repetition control algorithm after reading PES of each sector from the table storing PES obtained in the previous track in way of another example.

As described above, the present invention has an advantage to improve the efficiency of HDD by reducing repeatable following errors which often occur in the track-following mode of HDD.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for compensating a repeatable following error of a hard disk drive having a digital signal processor programmed with a feedback control operation algorithm and a repetition control algorithm, comprising the steps of:

obtaining data corresponding to position error signals from sectors detected along a track of a disk recording medium during a track following mode;

sequentially storing the data corresponding to the position error signals in a table; and obtaining a correction value for compensating a repeatable following error for a particular sector by processing the data corresponding to a position error signal of said particular sector and the data corresponding to the position error signals of preceding and succeeding sectors read from said table through said repetition control algorithm and feedback control algorithm.

2. The method of claim 1, further comprised of said repetition control algorithm of said digital signal processor low-pass filtering the data corresponding to the position error signal of the particular sector and the data corresponding to the position error signals of preceding and succeeding sectors, and determining the average of the data to obtain the correction value.

3. The method of claim 1, further comprised of said correction value corresponding to the position correction needed to position a transducer head over a centerline of the track of said particular sector.

4. The method of claim 1, further comprised of said feedback control algorithm combining data corresponding to the current sector using proportional, differential and integral equations to obtain the correction value.

5. A method for controlling a repeatable following error of a hard disk drive having a digital signal processor programmed with a feedback control algorithm and a repetition control algorithm, comprising the steps of:

reading a position error signal from each sector in a given track for one period of a disk, and sequentially storing position error signals from all sectors in the given track in a memory during a track following mode;

when following a first sector of a second period of the disk, transmitting the position error signal of a present sector and position error signals of a preceding and a succeeding sector read from said memory to said digital signal processor; and generating, by said digital signal processor, a correction value for position correction needed to position a transducer head over a centerline of the given track of the disk by processing the position error signals of the present sector and the preceding and succeeding sectors using said feedback control algorithm and said repetition control algorithm.

6. The method of claim 5, further comprised of said repetition control algorithm of said digital signal processor low-pass filtering the position error signal of the present sector and the position error signals of preceding and succeeding sectors, and then determining an average therefrom to obtain the correction value.

7. The method of claim 5, further comprised of said feedback control algorithm combining values obtained from the position error signal of the present sector using proportional, differential and integral equations to produce the correction value.

8. A method for controlling a repeatable following error of a hard disk drive having a digital signal processor programmed with a feedback control algorithm and a repetition control algorithm, comprising the steps of:

storing a relevant position error signal of each sector detected for one period in a given track in a memory;

transmitting a position error signal of a present sector when following a first sector of second period after storing said relevant position error signal of said each sector of the given track, and simultaneously transmitting a position error signal of the present following sector and position error signals of a preceding and a succeeding sector of said present following sector read from said memory to said digital signal processor;

generating two functional values by processing the position error signal of the present following sector and the position error signals of the preceding and succeeding sectors transmitted to said digital signal processor using said feedback control algorithm and said repetition control algorithm simultaneously;

generating a final correction value by combining said two functional values;

generating correction values of next sectors sequentially after generating a correction value of said first sector;

performing the track-following mode by moving to a next track after generating a correction value for the repeatable following error which occur while following said one track; and compensating for the repeatable following error of the moved track by reading the position error signal of same sector as said present following sector and the positional error signals of the preceding and succeeding sectors among position error signals of a previous track stored in said memory.

9. The method of claim 8, further comprised of said repetition control algorithm of said digital signal processor generating said final correction value by obtaining an average value after passing three position error signals read from said memory in a lowpass filter.

10. A method for controlling a repeatable following error of a disk drive, comprising the steps of:

reading a position error signal from each sector in a given track for one period of a disk, and sequentially storing position error signals from all sectors in the given track in a memory during a track following mode;

when following a first sector of a second period of the disk, transmitting the position error signal of a present sector and position error signals of a preceding and a succeeding sector read from said memory; and generating a correction value for position correction needed to position a transducer head over a centerline of the given track of the disk by processing the position error signals of the present sector and the preceding and succeeding sectors.

11. The method of claim 10, further comprising a repetition control algorithm being used to filter the position error signal of the present sector and the position error signals of preceding and succeeding sectors, and then determine an average therefrom to obtain the correction value.

12. The method of claim 10, further comprising a feedback control algorithm being used to combine values obtained from the position error signal of the present sector using proportional, differential and integral equations to produce the correction value.

* * * * *